(12) United States Patent
Rock et al.

(10) Patent No.: US 7,249,145 B1
(45) Date of Patent: Jul. 24, 2007

(54) METHODS AND APPARATUS FOR SELECTING CANDIDATES TO INTERVIEW

(75) Inventors: Peter Joseph Rock, Byfield, MA (US); Robert Patrick Tameo, South Peabody, MA (US); Brian Edward Dix, Ipswich, MA (US); Kevin John Brown, Peabody, MA (US); Bridget Buzdon Davis, Wenham, MA (US)

(73) Assignee: General Electric Company, Schenectady, NY (US)

( * ) Notice: Subject to any disclaimer, the term of this patent is extended or adjusted under 35 U.S.C. 154(b) by 294 days.

(21) Appl. No.: 09/687,420

(22) Filed: Oct. 13, 2000

(51) Int. Cl.
G06F 17/30 (2006.01)
(52) U.S. Cl. ...................... 707/104.1; 705/9
(58) Field of Classification Search .............. 707/1, 707/3, 10, 11, 104.1; 705/11, 8, 9; 382/118
See application file for complete search history.

(56) References Cited

U.S. PATENT DOCUMENTS

| | | | |
|---|---|---|---|
| 4,937,743 A | 6/1990 | Rassman et al. | |
| 5,111,391 A | 5/1992 | Fields et al. | |
| 5,117,353 A | 5/1992 | Stipanovich et al. | |
| 5,197,004 A | 3/1993 | Sobotka et al. | |
| 5,212,635 A | 5/1993 | Ferriter | |
| 5,239,460 A | 8/1993 | LaRoche | |
| 5,289,368 A | 2/1994 | Jordan et al. | |
| 5,325,292 A | 6/1994 | Crockett | |
| 5,343,388 A | 8/1994 | Wedelin | |
| 5,369,570 A | 11/1994 | Parad | |
| 5,408,663 A | 4/1995 | Miller | |
| 5,416,694 A | 5/1995 | Parrish et al. | |
| 5,467,268 A | 11/1995 | Sisley et al. | |
| 5,500,795 A | 3/1996 | Powers et al. | |
| 5,590,269 A | 12/1996 | Kruse et al. | |
| 5,592,375 A | 1/1997 | Salmon et al. | |
| 5,596,652 A | 1/1997 | Piatek et al. | |
| 5,615,121 A | 3/1997 | Babayev et al. | |
| 5,617,342 A | 4/1997 | Elazouni | |
| 5,623,404 A | 4/1997 | Collins et al. | |
| 5,636,920 A | 6/1997 | Shur et al. | |
| 5,684,964 A | 11/1997 | Powers et al. | |
| 5,737,728 A | 4/1998 | Sisley et al. | |
| 5,764,953 A | 6/1998 | Collins et al. | |
| 5,765,140 A | 6/1998 | Knudson et al. | |
| 6,266,659 B1 * | 7/2001 | Nadkarni | 705/11 |
| 6,275,812 B1 * | 8/2001 | Haq et al. | 705/11 |
| 6,385,620 B1 * | 5/2002 | Kurzius et al. | 707/104.1 |
| 6,430,306 B2 * | 8/2002 | Slocum et al. | 382/118 |
| 6,463,430 B1 * | 10/2002 | Brady et al. | 707/3 |
| 6,591,246 B1 * | 7/2003 | Tuttle | 705/11 |
| 6,662,194 B1 * | 12/2003 | Joao | 707/104.1 |

* cited by examiner

*Primary Examiner*—Leslie Wong
(74) *Attorney, Agent, or Firm*—William Scott Andes; Armstrong Teasdale LLP

(57) ABSTRACT

A candidate selection system that generates data-driven candidate selections of large populations of submitted résumés using common independent assessment variables and against desired qualities is described. A processor executing the candidate selection program is pre-programmed to include a listing of desired qualities that the ideal candidate for the position should possess. Each submitted résumé is reviewed and data input from the résumés is normalized to produce values representing weighted scores unique to the specific candidate and in terms of the sought-after desired dependant qualities.

15 Claims, 5 Drawing Sheets

| CANDIDATE | ANALYTICAL/TECHNICAL ABILITY | SELF-CONFIDENCE | INITIATIVE | CHANGE ORIENTATION | INTERPERSONNAL SKILLS | TOTAL | AVERAGE SCORE | MAJOR (ME, EE, AE) | DEGREE (BS, MS, PHD) | UNIVERSITY |
|---|---|---|---|---|---|---|---|---|---|---|
| #1 | 33.3 | 28.6 | 57.1 | 0.0 | 50.0 | 38.5 | 33.8 | ME | BS | MIT |
| #2 | 66.7 | 42.9 | 42.9 | 33.3 | 0.0 | 46.2 | 37.1 | ME | BS | MIT |
| #3 | 66.7 | 57.1 | 57.1 | 33.3 | 50.0 | 61.5 | 52.9 | AE | BS | MIT |
| #4 | 50.0 | 42.9 | 71.4 | 0.0 | 25.0 | 46.2 | 37.9 | ME | BS | MIT |
| #5 | 66.7 | 28.6 | 28.6 | 0.0 | 25.0 | 30.8 | 29.8 | ME | BS | MIT |
| #6 | 33.3 | 14.3 | 57.1 | 0.0 | 25.0 | 30.8 | 26.0 | ME | BS | MIT |
| #7 | 66.7 | 71.4 | 57.1 | 33.3 | 75.0 | 61.5 | 60.7 | ME | BS | MIT |
| #8 | 50.0 | 28.6 | 57.1 | 0.0 | 25.0 | 46.2 | 32.1 | ME | BS | MIT |
| #9 | 0.0 | 14.3 | 28.6 | 0.0 | 25.0 | 15.4 | 13.6 | ME | BS | MIT |
| #10 | 0.0 | 0.0 | 0.0 | 0.0 | 0.0 | 0.0 | 0.0 | AE | BS | MIT |
| #11 | 66.7 | 28.6 | 57.1 | 0.0 | 50.0 | 46.2 | 40.5 | ME | BS | MIT |
| #12 | 33.3 | 42.9 | 57.1 | 0.0 | 25.0 | 38.5 | 31.7 | ME | BS | MIT |
| #13 | 16.7 | 28.6 | 28.6 | 0.0 | 75.0 | 23.1 | 29.8 | ME | BS | MIT |
| #14 | 33.3 | 28.6 | 57.1 | 0.0 | 25.0 | 38.5 | 28.8 | ME | BS | MIT |
| #15 | 50.0 | 71.4 | 57.1 | 66.7 | 100.0 | 69.2 | 69.0 | ME | BS | MIT |
| #16 | 16.7 | 14.3 | 14.3 | 0.0 | 0.0 | 15.4 | 9.0 | ME | BS | MIT |
| #17 | 50.0 | 28.6 | 57.1 | 0.0 | 50.0 | 38.5 | 37.1 | ME | BS | MIT |
| #18 | 66.7 | 28.6 | 57.1 | 0.0 | 50.0 | 53.8 | 40.5 | AE | BS | MIT |
| #19 | 16.7 | 28.6 | 42.9 | 0.0 | 25.0 | 23.1 | 22.6 | ME | BS | MIT |
| #20 | 16.7 | 28.6 | 57.1 | 0.0 | 50.0 | 38.5 | 30.5 | ME | BS | MIT |
| #21 | 66.7 | 57.1 | 71.4 | 0.0 | 75.0 | 61.5 | 54.0 | ME | BS | CLARKSON |
| #22 | 50.0 | 57.1 | 42.9 | 66.7 | 25.0 | 53.8 | 48.3 | EE | MS | MIT |
| #23 | 16.7 | 28.6 | 14.3 | 0.0 | 50.0 | 23.1 | 21.9 | ME | BS | PRINCETON |

FIG. 5

METHODS AND APPARATUS FOR SELECTING CANDIDATES TO INTERVIEW

BACKGROUND OF THE INVENTION

This application relates generally to hiring processes and, more particularly, to a candidate selection system.

Optimally selecting individuals to interview for specific jobs from a large population of résumés is a formidable task to complete for a human resources manager who must attempt to simultaneously balance internal desired skill preferences and considerations against various regulatory and internal hiring criteria while filtering through the large populations of résumés to identify qualifications or skills that may be easily transferable to the specific job. Often these desired qualities include an individual's analytical ability, self-confidence, initiative, and interpersonal skills. Additionally, each potential job includes several factors which are often unique to the specific job, and must also be considered by the human resources manager.

As a result, human resources managers often use labor-intensive screening methods to select candidates to interview for the jobs. Simply identifying ideal candidates for a position may require significant effort.

BRIEF SUMMARY OF THE INVENTION

In an exemplary embodiment, a processing system under the control of a candidate selection program performs data-driven candidate selections from large populations of submitted résumés while using common independent assessment variables that are normalized against desired qualities. The candidate selection program provides for weighted desired qualities that an ideal candidate should possess. Each submitted résumés is reviewed and a weight factor is entered for each desired quality depending on whether the résuméindicates that the candidate possesses that characteristic.

During execution of the candidate selection program, the characteristics of the candidate are input and linked to the various pre-set desired qualities. The data input from the résumés is normalized to produce values which represent weighted scores of the independent candidate characteristics in terms of the sought-after desired dependant qualities. As a result of the normalization process, the candidates may be directly compared to determine which candidates should be more closely reviewed by the human resources manager.

BRIEF DESCRIPTION OF THE DRAWINGS

FIG. 5 is an exemplary tabular output displayed using the system shown in FIG. 2.

DETAILED DESCRIPTION OF THE INVENTION

Figure 1:
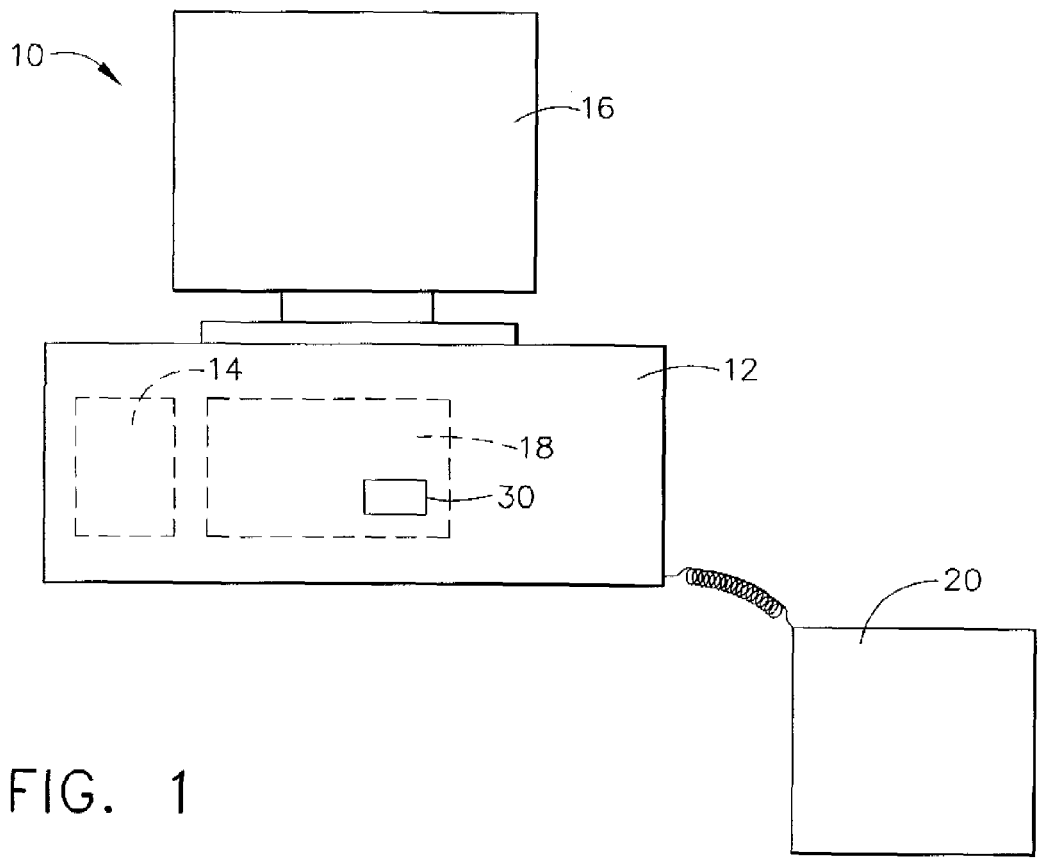
FIG. 1 is a system block diagram.

FIG. 1 is a block diagram of a processing system 10 according to one embodiment of the present invention. Processing system 10 includes a central processing unit (CPU) 12, a random access memory (RAM) 14, an output device 16, for example a monitor, a mass storage device 18, and an input device 20, for example a keyboard. Processing system 10 may be a single user system, for example, a microcomputer, or a multi-user system including a server (not shown) and a plurality of devices (not shown) connected to the server. In one embodiment, processing system 10 is accessible via the Internet through many interfaces including through a network, such as a local area network (LAN) or a wide area network (WAN), through dial-in-connections, cable modems and special high-speed ISDN lines. Additionally, system 10 may include multiple input devices 20, i.e., a keyboard, a mouse, or various automated data input devices, i.e., an optical scanner (not shown). A candidate selection system program 30 is stored in mass storage device 18 and is executed by data processing system 10.

Figure 2:
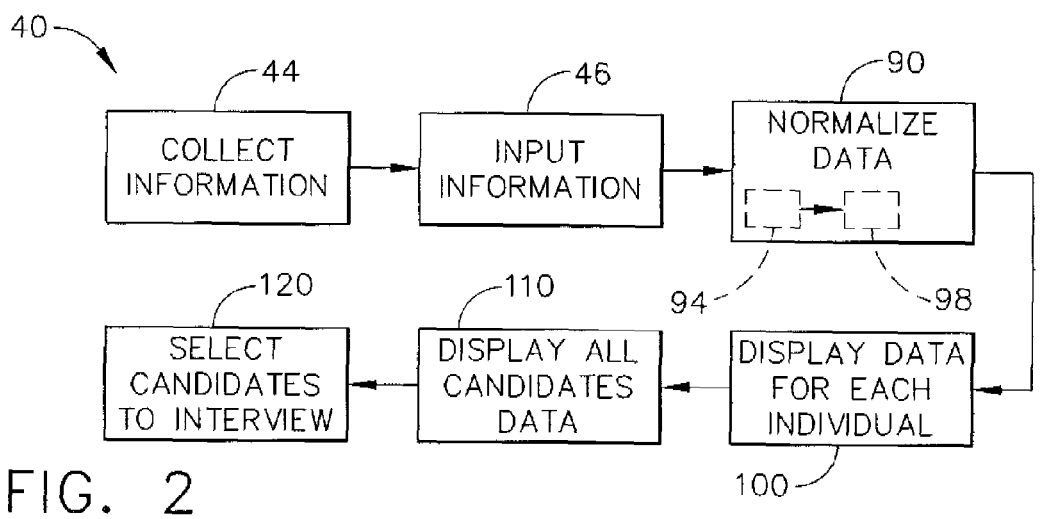
FIG. 2 is an exemplary embodiment of an information flow diagram of a candidate selection system.
Figure 3:
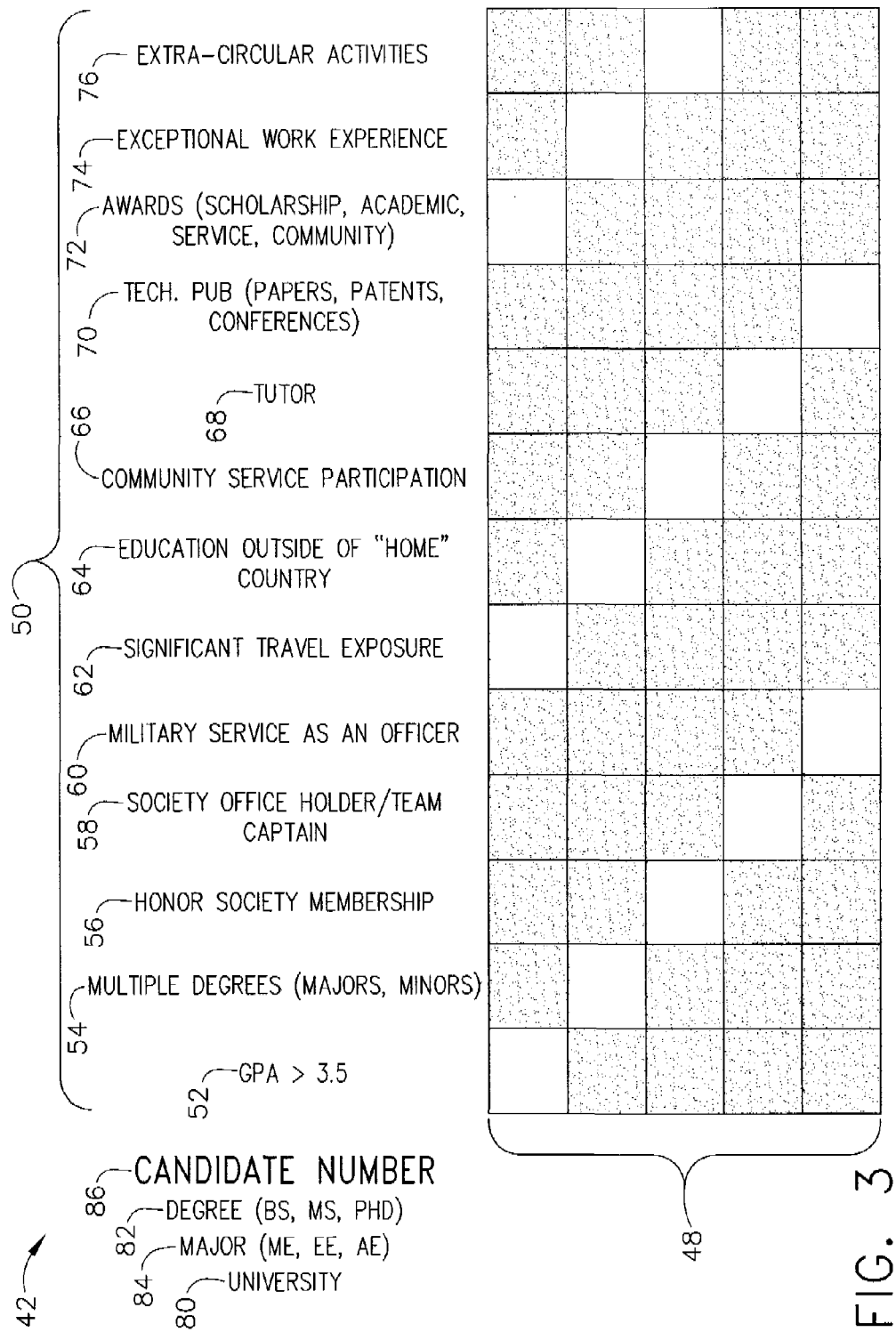
FIG. 3 is an independent variable assessment matrix used with the candidate selection system shown in FIG. 2.

FIG. 2 is an exemplary embodiment of an information flow diagram 40 illustrating process steps executed by processing system 10 under the control of program 30 (shown in FIG. 2). FIG. 3 is an independent variables assessment matrix 42 used with candidate selection system program 30. Initially information is gathered 44 for candidate selection system program 30. More specifically, information pertaining to desired candidate qualities is gathered 44 by assessing a résumés of each candidate submitted. In one embodiment, the information gathered 44 pertains to five desired candidate qualities including analytical ability, self-confidence, initiative, change orientation, and interpersonal skills. The desired candidate qualities are variable and are pre-selected based on hiring criteria of the specific job.

Candidate selection program 30 includes independent candidate variables, such as experiences and exhibited abilities, that tend to correlate to sought-after dependant qualities, such as the aforementioned five desired candidate qualities. For example, candidates with significant tutoring exposure may tend to exhibit strong analytical ability, self-confidence, and interpersonal skills, while candidates with extensive education or work experience outside the candidate's "home" country may be indicative of strong change orientation ability.

The information gathered 44 is input 46 into matrix 42, shown in FIG. 3. More specifically, after candidate selection program 30 is accessed, a macro (not shown) automatically guides a user through a series of input selections 48. The macro prompts a user to enter a one or a zero within a plurality of candidate background categories 50 that represent qualifications of the specific candidate being assessed. More specifically, a user enters a one if a category 50 is applicable to the candidate and a null entry if a category 50 is not applicable to the candidate.

In the exemplary embodiment, matrix 42 includes a category 52 representing a grade point average greater than 3.5 out of 4.0, a category 54 representing multiple degrees, majors or minors, a category 56 representing honor society membership, a category 58 representing society office holder or team captain, a category 60 representing military service, a category 62 representing significant travel exposure, and a category 64 representing education outside of "home" country. Additionally, in the exemplary embodiment, matrix 42 also includes a category 66 representing community service participation, a category 68 representing tutor experience, a category 70 representing technical publication including papers, patents, and conferences, a category 72 representing awards including scholarships, academic service awards, and community awards, a category 74 representing exceptional work experience, and a category 76 representing extra-curricular activities.

As shown in FIG. 3, the macro executed to complete independent variables assessment matrix 42 also prompts a user to input 46 a university 80 attended by the candidate, a degree 82 and major 84 earned by the candidate, and a number 86 assigned to the candidate. A separate matrix 42 is then completed for each candidate being considered for selection. In one embodiment, matrix 42 is displayable in a tabular output format as shown in FIG. 3.

After all of the individual matrices 42 have been completed for each candidate being considered for selection, information input 46 is normalized 90. Because date input 46 is normalized 90, candidate selection system program 30 assesses categories 50 input 46 for each candidate to quantitatively assess 92 each candidate's background against known the aforementioned desired qualities, and compare the various candidates against each other.

Specifically, to normalize 90 the data, each category 50 is totaled 94 to obtain a sum total for all identified independent qualifications input 46 into matrix 42. Each sum total is then divided 98 by a value representing a total possible per desired candidate quality. The value representing the total possible per desired candidate quality is variable depending upon a weight factor assigned to the desired qualities originally selected and input to the processor. In the exemplary embodiment, each desired quality is assigned a weight factor equal to one. The result represents a weighted score of the independent candidate variables input 46 in terms of the sought-after desired dependant qualities. More specifically, to assess analytical ability, information input 46 in categories 52, 54, 56, 68, 70, and 72 is totaled 94 and divided 98 by the total possible value of six. To assess self-confidence information input 46 in categories 54, 58, 60, 62, 64, 68, and 74 is totaled 94 and divided 98 by the total possible value of seven. To assess initiative, information input 46 in categories 52, 54, 58, 66, 70, 72, and 76 is totaled and divided by the total possible value of seven. To assess change orientation, information input 46 in categories 60, 62, and 64 is totaled 94 and divided 98 by the total possible value of three. To assess interpersonal skills, information input 46 in categories 58, 64, 66, and 68 is totaled 94 and divided by the total possible value of four.

The assessments are then displayed 100. In one embodiment, the assessments are displayed 100 in a tabular output format (not shown in FIGS. 2 and 3). In an alternative embodiment, the assessments are displayed 100 in graphical output format (not shown in FIGS. 2 and 3). The assessments are generated for each candidate, and displayed 100 separately for each candidate.

After assessments are generated for each candidate, candidate selection program 30 displays 110 the assessments in a tabular output format (not shown in FIGS. 2 and 3) that includes all of the candidates considered for selection. In one embodiment, the tabular output format includes columns (not shown in FIGS. 2 and 3) that illustrate for each candidate a weighted value in each desired quality, a total value, an average score, and each candidate's college, their major, and their degree. In another embodiment, a graphical output format is displayed 110 that graphically illustrates either the total score or the average score for each candidate.

Candidates to be interviewed are not directly selected as an end result of candidate selection system program 30 being executed. Rather, after candidate selection system program 30 is executed, data is provided to the user to select 120 specific candidates worthy of a more detailed review. As a result, data-driven candidate selections can be made on large populations of submitted résumé using common independent assessment variables and against desired qualities.

Figure 4:
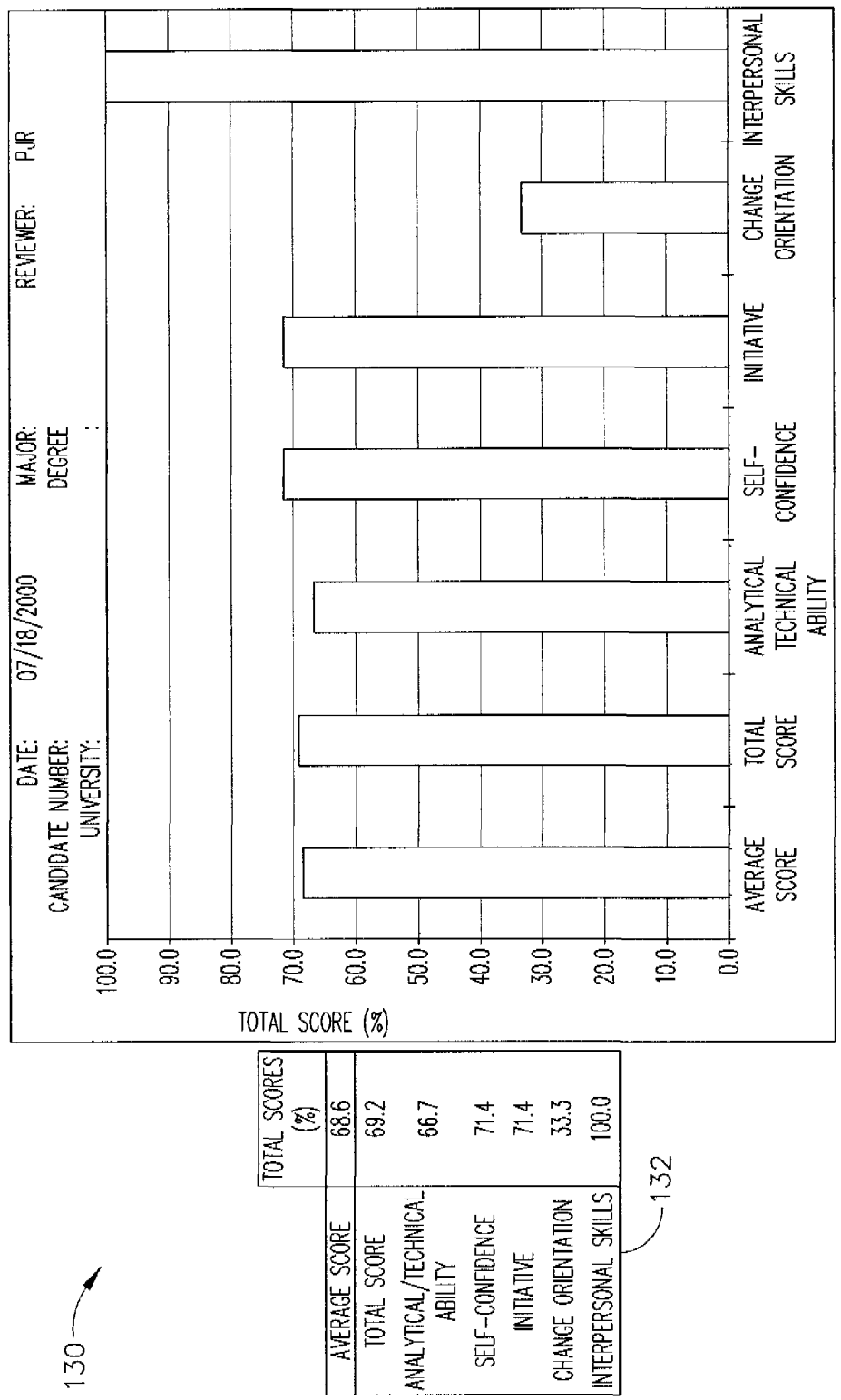
FIG. 4 is an exemplary graphical representation of candidate strengths displayed using the system shown in FIG. 2.
Figure 6:
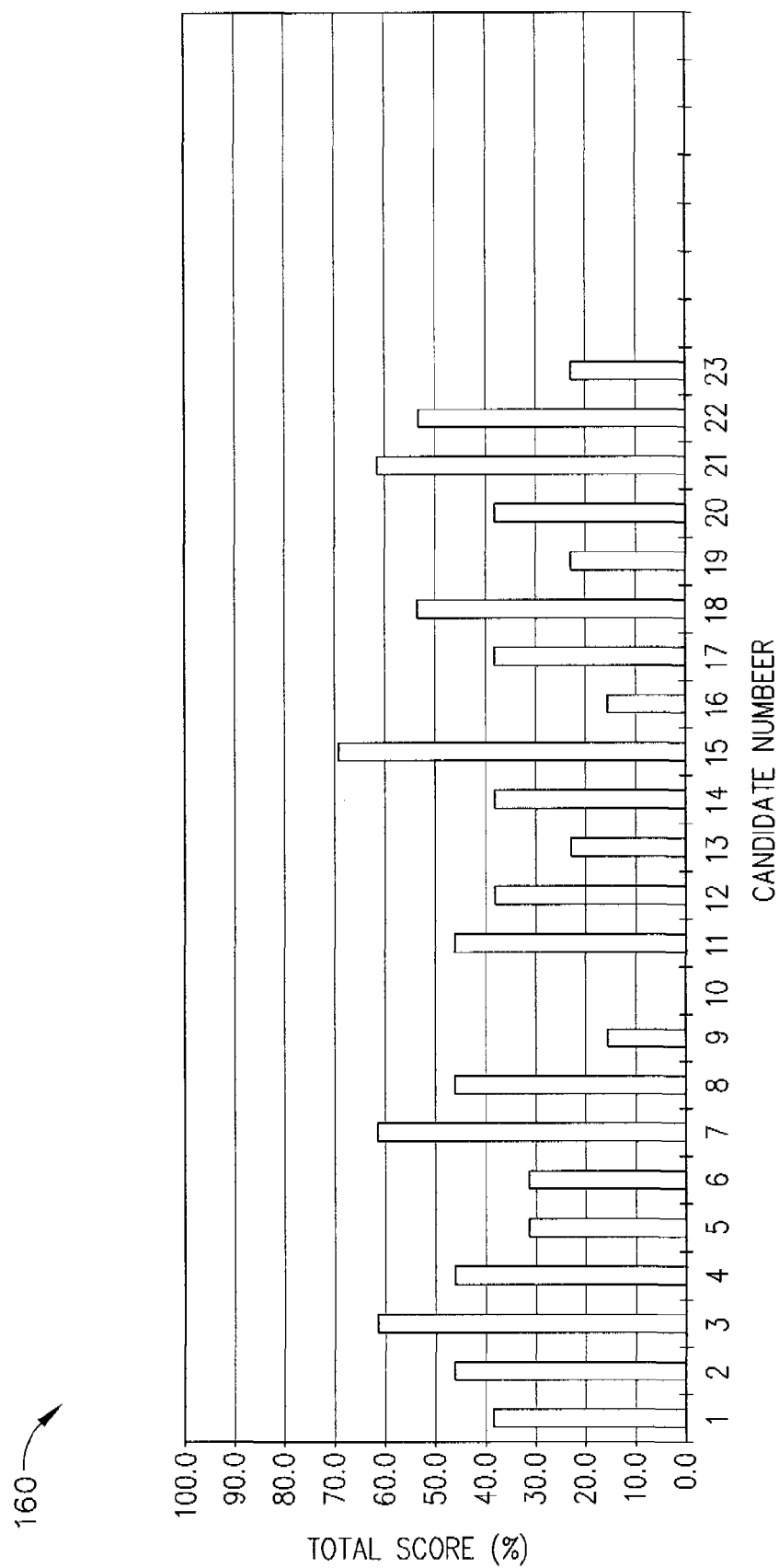
FIG. 6 is a graphical output of the data shown in FIG. 5.

FIGS. 4 through 6 illustrate exemplary outputs obtained as a result of executing candidate selection system program 30 (shown in FIG. 1) and the process steps illustrated in FIG. 2 with data processing system 10 (shown in FIG. 1). More specifically, FIG. 4 is an exemplary graphical output format 130 illustrating assessment values for an individual candidate. More specifically, graphical output format 130 is displayed 100 (shown in FIG. 2) after data entered for a specific candidate has been normalized 90 (shown in FIG. 2).

Graphical output format 130 illustrates a total score percentage of the independent variables input 46 (shown in FIG. 2) for each candidate and for each sought-after desired dependant quality. In the exemplary embodiment, the candidate received inputs in four out of six categories 52, 54, 56, 68, 70, and 72 (shown in FIG. 3) assessed for analytical ability, five out of seven categories 54, 58, 60, 62, 64, 68, and 74 (shown in FIG. 3) assessed for self-confidence, five out of seven categories 52, 54, 58, 66, 70, 72, and 76 (shown in FIG. 3) assessed for initiative, one of three categories 60, 62, and 64 (shown in FIG. 3) assessed for change orientation, and all four categories 58, 64, 66, and 68 (shown in FIG. 3) assessed for interpersonal skills. As a result, after normalizing 90 (shown in FIG. 2) the candidate received the total score percentages represented in a summary table 132 and graphical output format 130.

FIG. 5 is an exemplary tabular output format 140 illustrating assessment values for twenty-three candidates. Tabular output format 140 includes columns 142 that illustrate a weighted value in each desired quality for each candidate, a column 144 that illustrates a total value for each candidate, and a column 146 that illustrates an average score for each candidate. Additionally, columns 150, 152, and 154 illustrate respectively, each candidate's college, their major, and their degree.

FIG. 6 is a graphical output format 160 illustrating total score as a percentage for each candidate. More specifically, graphical output format 160 graphically illustrates the total scores for the candidates shown in FIG. 5. In an alternative embodiment, graphical output format 160 graphically illustrates other columns 142, 144, and 146 shown in FIG. 5.

The above-described selection process for candidate selection provides data to a user for identifying specific candidates worthy of a more detailed review. More specifically, as a result of the candidate selection program, large populations of résumés may be assessed using common independent assessment variables and against desired qualities. The process executed within the candidate selection program provides a method of assessing résumés in a manner that is reliable, is easily adaptable to other hiring criteria, and is cost-effective.

While the invention has been described in terms of various specific embodiments, those skilled in the art will recognize that the invention can be practiced with modification within the spirit and scope of the claims.

What is claimed is:

1. A computer-implemented method for determining candidates to interview, said method comprising the steps of:
providing pre-determined desired qualities for a candidate, the desired qualities include at least two of analytical ability, self-confidence, initiative, change orientation, and interpersonal skills;
prompting a user to determine and input into a computer whether the candidate possesses at least one of a plurality of independent characteristics, a predetermined combination of characteristics being indicative of a degree to which the candidate possesses the desired qualities;

prompting the user to input the candidate's educational background and personal background;

generating a database in a computer readable medium including at least one characteristic for each candidate wherein the at least one characteristic is correlative to the desired qualities;

normalizing the characteristics, normalizing includes comparing a total number of characteristics, possessed by the candidate, of a combination of characteristics that determine each desired quality, to a total number of possibly possessed characteristics for the desired quality, and assigning a value to each desired quality based on the comparison;

displaying results for each candidate based on the desired quality values;

selecting at least one candidate to interview based on the desired quality values; and displaying, in at least one of a tabular form and a graphical form, the results, the educational background, and the personal background for each of the at least one candidate selected, to enable the user to compare the selected candidates.

2. A method in accordance with claim 1 wherein the step of normalizing the characteristics further comprises the steps of:

obtaining pre-determined desired qualities associated with each characteristic; and normalizing the characteristics of each candidate with the pre-determined desired qualities associated with each characteristic.

3. A method in accordance with claim 1 wherein said step of normalizing the characteristics further comprises the steps of:

summing the normalized characteristics of each candidate; and dividing the sum total of the normalized characteristics by a pre-determined value representing a total amount possible.

4. A method in accordance with claim 1 wherein prompting a the user to determine and input into a computer whether the candidate possesses at least one of a plurality of independent characteristics comprises prompting the user to determine and input into the computer whether the candidate possesses at least one of a grade point average greater than 3.5 out of 4.0, multiple degrees, multiple majors, multiple minors, an honor society membership, a society officer position, a team captain position, military service, significant travel exposure, education outside a home country of the candidate, community service participation, tutor experience, technical publication, awards, exceptional work experience, and extracurricular activities.

5. A method in accordance with claim 1 wherein prompting a the user to determine and input into a computer whether the candidate possesses at least one of a plurality of independent characteristics comprises prompting the user to make a subjective assessment of whether the candidate possesses at least one of a plurality of independent characteristics.

6. A selection system for determining candidates to interview, said system comprising:

a database stored in a memory comprising at least one independent characteristic for each candidate, and pre-determined dependent desired qualities for a candidate wherein the desired qualities include at least two of analytical ability, self-confidence, initiative, change orientation, and interpersonal skills and wherein the at least one characteristic is correlative to the desired qualities, a predetermined combination of characteristics being indicative of a degree to which the candidate possesses the desired qualities, the memory further comprising educational background and personal background for each candidate;

a processor programmed to:

prompt a user to determine whether the candidate possesses the at least one independent characteristic;

normalize the characteristics by comparing a total number of characteristics, possessed by the candidate, of a combination of characteristics that determine each desired quality, to a total number of possibly possessed characteristics for the dependent desired quality, and assigning a value to each of the desired qualities;

display results for each candidate based on the desired quality values; and display, in at least one of a tabular form and a graphical form, the results, the educational background, and the personal background for each of a candidate selected to be interviewed, to enable the selected candidates to be compared by the user.

7. A selection system in accordance with claim 6 wherein said pre-determined desired qualities comprise analytical ability, self-confidence, initiative, change orientation, and interpersonal skills.

8. A selection system in accordance with claim 6 wherein to normalize the characteristics, said processor programmed to:

obtain pre-determined desired qualities associated with each characteristic; and normalize characteristics of each candidate to desired known qualities associated with each characteristic.

9. A selection system in accordance with claim 6 wherein said processor programmed to:

rank each candidate based on normalized characteristics; and sum the normalized characteristics of each candidate.

10. A selection system in accordance with claim 9 wherein to rank each candidate based on normalized characteristics, said processor further programmed to divide the sum total of all normalized characteristics by an amount representing a pre-determined possible total.

11. Apparatus for screening candidates to interview, said apparatus comprising:

a processor comprising a memory and programmed to:

generate a database in the memory comprising at least one characteristic for each candidate, and pre-determined desired qualities for a candidate wherein the desired qualities include at least two of analytical ability, self-confidence, initiative, change orientation, and interpersonal skills, and wherein the at least one characteristic is correlative to the desired qualities, a pre-determined combination of characteristics being indicative of a degree to which the candidate possesses the desired qualities, the memory further comprising educational background and personal background for each candidate;

prompt a user to determine whether the candidate possesses the at least one independent characteristic;

normalize the characteristics desired qualities by comparing a total number of characteristics, possessed by the candidate, of a combination of characteristics that determine each desired quality, to a total number of possibly possessed characteristics for the dependent desired quality, and assigning a value to each of the desired qualities;

display results for each candidate based on the desired quality values; and display, in at least one of a tabular form and a graphical form, the results, the educational background, and the personal background for each of a candidate selected to be interviewed, to enable the selected candidates to be compared.

12. Apparatus in accordance with claim 11 wherein said pre-determined desired qualities comprise analytical ability, self-confidence, initiative, change orientation, and interpersonal skills.

13. Apparatus in accordance with claim 11 wherein to normalize the characteristics, said processor further programmed with predetermined desired qualities associated with each characteristic.

14. Apparatus in accordance with claim 11 wherein to normalize the characteristics, said processor further programmed to normalize candidate characteristics with known qualities associated with each characteristic.

15. Apparatus in accordance with claim 11 wherein said processor is further programmed to rank each candidate by:

summing the normalized characteristics of each candidate; and dividing the sum total of the normalized characteristics by an amount representing a pre-determined possible total.

* * * * *

UNITED STATES PATENT AND TRADEMARK OFFICE
CERTIFICATE OF CORRECTION

PATENT NO.       : 7,249,145 B1
APPLICATION NO.  : 09/687420
DATED            : July 24, 2007
INVENTOR(S)      : Rock et al.

Page 1 of 1

It is certified that error appears in the above-identified patent and that said Letters Patent is hereby corrected as shown below:

In Claim 4, column 5, line 43, delete "a the user to determine" and insert therefor -- the user to determine --.
In Claim 5, column 5, line 56, delete "a the user to determine" and insert therefor -- the user to determine --.

Signed and Sealed this

Fourth Day of December, 2007

JON W. DUDAS
*Director of the United States Patent and Trademark Office*